United States Patent
Ishibashi

(10) Patent No.: US 7,421,284 B2
(45) Date of Patent: Sep. 2, 2008

(54) ELECTRONIC DEVICE REMOVABLY MOUNTED ON PORTABLE TERMINAL EQUIPMENT

(75) Inventor: Takanobu Ishibashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 437 days.

(21) Appl. No.: 11/180,607

(22) Filed: Jul. 14, 2005

(65) Prior Publication Data
US 2006/0014566 A1  Jan. 19, 2006

(30) Foreign Application Priority Data
Jul. 14, 2004  (JP) .............................. 2004-207757

(51) Int. Cl.
*H04M 1/00* (2006.01)
*H04B 1/38* (2006.01)
*H04B 7/00* (2006.01)

(52) U.S. Cl. ..................... 455/556.1; 455/74; 455/557; 455/41.2

(58) Field of Classification Search ............. 455/556.1, 455/558, 550.1, 556.2, 557, 575.1, 90.2, 455/90.3, 74, 91, 95, 422.1, 41.1, 41.2
See application file for complete search history.

(56) References Cited

U.S. PATENT DOCUMENTS

| | | | | |
|---|---|---|---|---|
| 5,625,534 | A * | 4/1997 | Okaya et al. ................. | 361/686 |
| 5,675,524 | A * | 10/1997 | Bernard ....................... | 708/109 |
| 5,859,628 | A * | 1/1999 | Ross et al. ................... | 345/173 |
| 5,890,016 | A * | 3/1999 | Tso .............................. | 710/64 |
| 6,118,986 | A * | 9/2000 | Harris et al. ............. | 455/575.3 |
| 6,164,531 | A * | 12/2000 | Harris et al. ................ | 235/380 |
| 6,257,486 | B1 * | 7/2001 | Teicher et al. ............... | 235/380 |
| 6,259,769 | B1 * | 7/2001 | Page et al. ................... | 235/375 |
| 7,130,616 | B2 * | 10/2006 | Janik ........................ | 455/412.1 |
| 2002/0177407 | A1 | 11/2002 | Mitsumoto | |
| 2004/0104268 | A1 | 6/2004 | Bailey | |

FOREIGN PATENT DOCUMENTS

| | | |
|---|---|---|
| DE | 195 26 730 A1 | 2/1996 |
| DE | 101 05 058 A1 | 8/2002 |
| EP | 1 037 450 A2 | 9/2000 |
| JP | 2004-348235 A | 12/2004 |
| WO | WO 00/02361 | 1/2000 |
| WO | WO 01/73684 A1 | 10/2001 |
| WO | WO 02/01839 A2 | 1/2002 |
| WO | WO 2004/051904 A2 | 6/2004 |

OTHER PUBLICATIONS

European Search Report dated May 15, 2007 for Appln. No. 05013940.1-2414.
European Search Report dated May 15, 2008 for Appln. No. 05013940.1-2414.

* cited by examiner

*Primary Examiner*—Sonny Trinh
(74) *Attorney, Agent, or Firm*—Pillsbury Winthrop Shaw Pittman, LLP

(57) ABSTRACT

A contact less function chip includes a communication control circuit for contact less communication and a memory which stores setting data items of various communication protocols for contact less communication applied to the communication control circuit for contact less communication. When the contact less function chip is mounted on a mobile telephone, it acquires equipment information of the mobile telephone, determines a communication protocol for contact less communication to be preferentially performed based on the equipment information of the mobile telephone and makes a communication setting for the communication control circuit according to setting data of the communication protocol which is determined to be preferentially performed.

20 Claims, 7 Drawing Sheets

ELECTRONIC DEVICE REMOVABLY MOUNTED ON PORTABLE TERMINAL EQUIPMENT

CROSS-REFERENCE TO RELATED APPLICATIONS

This application is based upon and claims the benefit of priority from prior Japanese Patent Application No. 2004-207757, filed Jul. 14, 2004, the entire contents of which are incorporated herein by reference.

BACKGROUND OF THE INVENTION

1. Field of the Invention

This invention relates to an electronic device removably mounted on a portable terminal equipment and having a function of performing contact less communication with an external device in a state in which it is mounted on the portable terminal equipment, for example, and a control method for the electronic device.

2. Description of the Related Art

Recently, a system which performs entrance/exit management or settles accounts by use of a card has become widely applied. Further, the penetration rate of portable terminal equipment such as mobile telephones has become high. In this situation, it is increasingly required to perform entrance/exit management or settle accounts by short-range radio communication by use of portable terminal equipment such as a mobile telephone (for example, contact less communication of a communication system in which a contact less type IC card is used). In other words, it is increasingly required to mount a short-range radio communication function (for example, a contact less communication function by use of a contact less IC card) as a local radio interface on the portable terminal equipment such as the mobile telephone.

In order to meet the above requirement, a method for directly mounting the short-range radio communication function on the portable terminal equipment is considered. However, if the above method for directly mounting the short-range radio communication function on the portable terminal equipment is used, it will take a long time to change information items such as communication setting information or personal setting information when the user changes the type of portable terminal equipment. Thus, if it is considered to change the type of portable terminal equipment or the like, it is considered adequate to attach the short-range radio communication function to the portable terminal equipment with a removable configuration.

Therefore, in recent years, the technique for inserting (mounting) an electronic device (for example, a chip portion of a combination card or a contact less IC card, PC card or various memory devices) having a contact less communication function into the portable terminal equipment is proposed. With the technique, the electronic device mounted on the portable terminal equipment performs contact less communication by use of an antenna for contact less communication mounted on the portable terminal equipment. However, with the above technique, there occurs a problem that it is not easy to make optimum communication settings.

BRIEF SUMMARY OF THE INVENTION

An object of this invention is to provide an electronic device which can be mounted on portable terminal equipment capable of making adequate communication settings and a control method for the electronic device.

An electronic device according to an aspect of the present invention which is removably mounted on portable terminal equipment comprises a communication control circuit which performs radio communication with an external device in a state in which the electronic device is mounted on the portable terminal equipment, a determining section which determines setting contents for the communication control circuit corresponding to the portable terminal equipment on which the electronic device is mounted, and a setting section which makes a setting for the communication control circuit based on the setting contents determined by the determining section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described a preferable embodiment of this invention in detail with reference to the accompanying drawings.

First, the configuration of a mobile telephone used as portable terminal equipment on which a contact less function chip C used as an electronic device according to the embodiment of this invention is mounted is explained.

Figure 1:
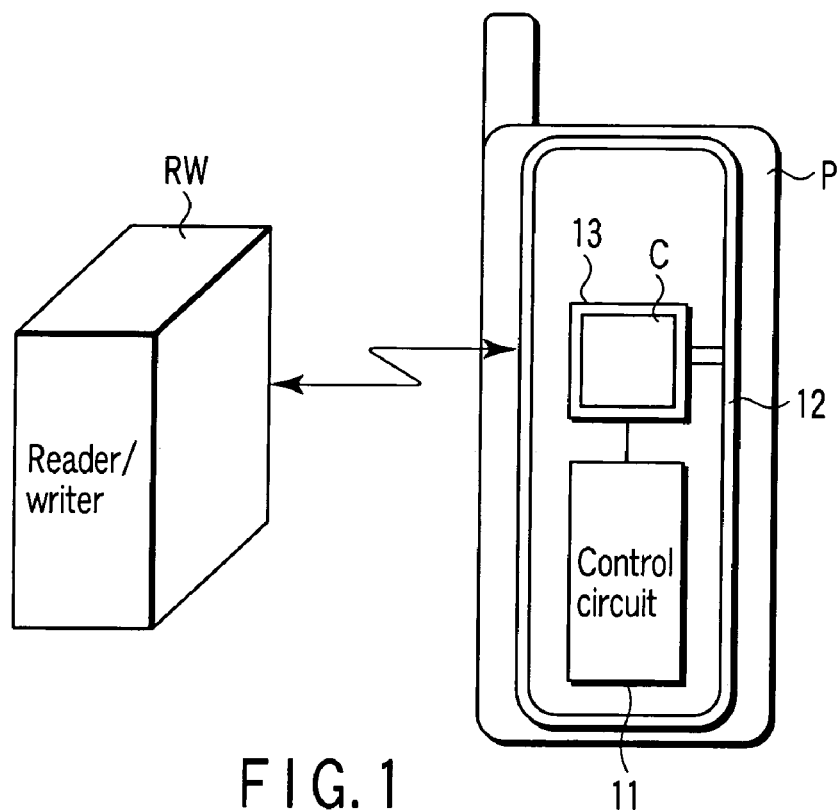
FIG. 1 is a view for schematically illustrating a communication system using a contact less function chip according to an embodiment of this invention and a mobile telephone on which the contact less function chip is mounted.

FIG. 1 is a view for illustrating an example of the configuration of a mobile telephone P used as portable terminal equipment on which the contact less function chip C used as the electronic device according to the embodiment of this invention is mounted.

The mobile telephone P shown in FIG. 1 has an electronic data transmission/reception function and a mobile telephone function as a normal mobile telephone function and a function of realizing the short-range radio communication by use of the electronic device which can be removably attached thereto as main functions. In the present embodiment, it is assumed that the contact less function chip C is used as the electronic device which is removably attached to the mobile telephone P. Further, the contact less function chip C performs contact less communication which is realized by a contact less type IC card as the short-range radio communication function. The contact less communication performed by use of the contact less function chip (electronic device) C mounted on the mobile telephone P permits contact less communication with a reader/writer RW used as an external device.

The mobile telephone P is configured to realize the contact less communication by use of the contact less function chip C and includes a control circuit 11, contact less communication antenna 12 and a socket 13 for the contact less function chip (which is hereinafter simply referred to as a socket) as shown in FIG. 1.

The control circuit 11 controls the whole portion of the mobile telephone P. The control circuit 11 includes a CPU, memory, various internal interfaces and the like. The control circuit 11 has a function such as a function of holding equipment information of the mobile telephone P or a function of communicating with the contact less function chip C mounted on the socket 13 for the contact less function chip in addition to a basic operating function of the mobile telephone. For example, the control circuit 11 performs mutual authentication (equipment authentication) with the contact less function chip C and supplies equipment information of the mobile telephone P to the contact less function chip C based on the communication function with the contact less function chip C.

The socket 13 for the contact less function chip is connected to the control circuit 11 and antenna 12. The socket 13 for the contact less function chip is so configured that the contact less function chip C can be mounted thereon. The socket 13 for the contact less function chip has a function of connecting the contact less function chip C to the control circuit 11 and connecting the contact less function chip C to the antenna 12.

The antenna 12 transmits/receives radio waves for contact less communication with respect to the reader/writer RW via the contact less function chip C. That is, the contact less function chip C is connected to the antenna 12 via the socket 13 for the contact less function chip so as to attain contact less communication (radio communication) with the reader/writer RW. The reader/writer RW is an external device performing radio communication with the contact less function chip C.

Next, the configuration of the contact less function chip C used as an electronic device mounted on the mobile telephone P used as the portable terminal equipment is explained.

The contact less function chip C is configured to be removably mounted on the mobile telephone P used as the portable terminal equipment. For example, the contact less function chip C is provided as a chip portion of a combination card or a contact less type IC card, an IC card of USIM(Universal Subscriber Identity Module) or SIM(Universal Subscriber Identity Module), PC card or various types of memory device. Further, the contact less function chip C meets the ISO/IEC14443 specification or ISO/IEC7816 specification as the basic specification, for example.

Figure 2:
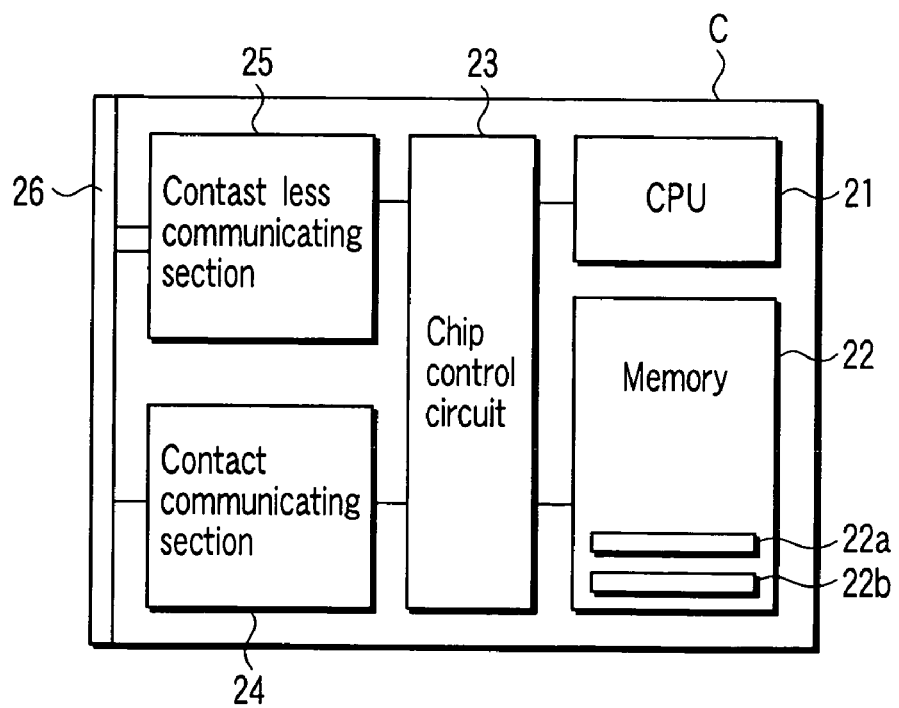
FIG. 2 is a block diagram schematically showing an example of the internal configuration of the contact less function chip.

FIG. 2 is a block diagram showing an example of the configuration of the contact less function chip C mounted on the mobile telephone P.

As shown in FIG. 2, the contact less function chip C includes a CPU 21, memory 22, chip control circuit 23, contact communicating section 24, contact less communicating section 25 and contact portion 26.

The CPU 21 performs various processes based on a program recorded in the memory 22. The memory 22 is configured by a ROM, RAM or rewritable nonvolatile memory (for example, EEPROM or flash ROM). In the memory 22, an equipment information table 22a and antenna characteristic table 22b are provided. The tables 22a, 22b are provided in the rewritable nonvolatile memory, for example.

The chip control circuit 23 is a circuit which controls the operation of the contact less function chip C according to the process by the CPU 21. The contact communicating section 24 is a unit which performs contact communication with the mobile telephone P. The contact communicating section 24 is configured to be connected to the control circuit 11 of the mobile telephone P via the contact portion 26 and the socket 13 of the mobile telephone 13. The contact less communicating section 25 is a unit which performs contact less communication (radio communication). The contact less communicating section 25 is configured to be connected to the antenna 12 of the mobile telephone P via the contact portion 26 and the socket 13 of the mobile telephone 13.

Next, the contact less communication by the contact less function chip C is schematically explained.

First, when the contact less function chip C is mounted on the socket 13 of the mobile telephone P, the contact communicating section 24 of the contact less function chip C is physically connected to the control circuit 11 of the mobile telephone P via the contact portion 26 of the contact less function chip C and the socket 13 of the mobile telephone P. In this state, the control circuit 11 of the mobile telephone P transmits equipment information of the mobile telephone P to the contact less function chip C. In this case, it is permitted for the CPU 21 of the contact less function chip C to issue a request to the mobile telephone P for equipment information by use of the contact communicating section 24 and receive equipment information from the mobile telephone P as a response.

When receiving the equipment information from the mobile telephone P, the contact less function chip C performs an antenna characteristic setting process and communication protocol setting process used in the contact less communication based on equipment information from the mobile telephone P. When the communication protocol setting process and antenna characteristic setting process are completed, the contact less communicating section 25 of the contact less function chip C mounted on the mobile telephone P is set into a state in which contact less communication with an external device such as the reader/writer RW can be performed by using the antenna 12 of the mobile telephone P.

Next, the communication setting process for contact less communication by the contact less function chip C is explained.

In this example, as the communication setting process for contact less communication by the contact less function chip C, a communication protocol setting process based on equipment information of the mobile telephone, an antenna characteristic setting process based on the measurement of the antenna characteristics and an antenna characteristic setting process based on equipment information of the mobile telephone are explained.

First, the communication protocol setting process for contact less communication in the contact less function chip C is explained.

Figure 3:
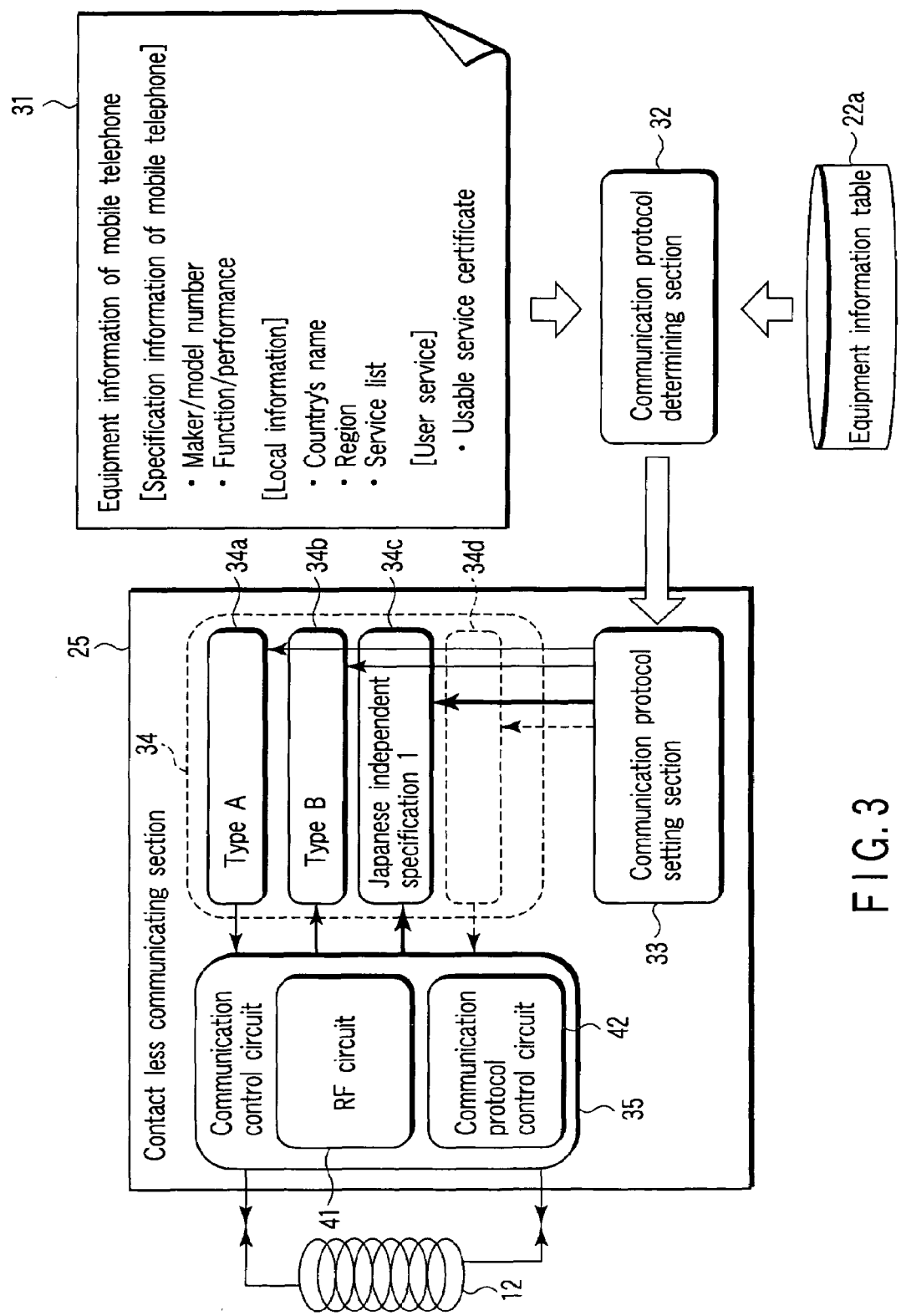
FIG. 3 is a diagram for illustrating an example of the configuration of the contact less function chip which realizes a communication protocol setting.

FIG. 3 is a diagram schematically showing an example of the configuration which realizes the communication protocol setting process for contact less communication in the contact less function chip C.

As shown in FIG. 3, the communication protocol setting process for contact less communication in the contact less function chip C is performed based on equipment information 31 acquired from the mobile telephone P and information stored in the equipment information table 22a. Further, the communication protocol setting process for contact less communication in the contact less function chip C is performed by use of a communication protocol determining section (communication protocol determining function) 32, communication protocol setting section (communication protocol setting function) 33, communication protocol setting data section 34 and communication control circuit 35.

The equipment information 31 is information acquired from the mobile telephone P. The equipment information 31 is supplied from the mobile telephone P when the contact less function chip C is mounted on the mobile telephone P. The equipment information 31 supplied from the mobile telephone P is recorded in the memory 22 in the contact less function chip C. For example, as the equipment information 31, as shown in FIG. 3, specification information of the mobile telephone, local information and user service information are provided. As the specification information of the mobile telephone, for example, information of a maker's name, model number, function, performance and the like is provided. Further, as the local information, for example, information of a country's name, region, service list and the like is provided. In addition, as the user service information, for example, information of a certificate (electronic certificate) of available service and the like is provided.

The equipment information table 22a is previously provided in the memory 22. In the equipment information table 22a, information indicating setting contents corresponding to the equipment information 31 of various mobile telephones is stored. For example, in the equipment information table 22a, information indicating a required communication protocol (a communication protocol which is required to be supported as a contact less communication function of the contact less function chip) or a communication protocol of contact less communication which is preferentially set is stored for communication setting of contact less communication corresponding to the equipment information. The equipment information table 22a is provided on a rewritable nonvolatile memory as described above. For example, information in the equipment information table 22a can be rewritten according to a change of the service contents at the operation time and a change of the specification of a system containing an external device which is a contact less communication partner.

The communication protocol determining section 32 determines a communication protocol which the contact less function chip C preferentially realizes for contact less communication based on the equipment information 31 and information stored in the equipment information table 22a. The function of the communication protocol determining section 32 is realized by the CPU 21 or chip control circuit 23.

The communication protocol setting section 33 sets a communication protocol for contact less communication based on determination by the communication protocol determining section 32. In the communication protocol setting section 33, a communication protocol to be realized with top priority is set, the priority order of various communication protocols is set or required communication protocol are set (a setting process is performed to activate only the required communication protocols). The function of the communication protocol setting section 33 is realized by the contact less communicating section 25 or chip control circuit 23.

In the communication protocol setting data section 34, various communication protocol setting data items set by the communication protocol setting section 33 are stored. The communication protocol setting data section 34 stores a plurality of communication protocol setting data items 34a, 34b, 34c, 34d, . . . . The communication protocol setting data section 34 is configured by a rewritable nonvolatile memory. For example, the communication protocol setting data section 34 is configured by the memory 22, an internal memory (not shown) of the contact less communicating section 25 or an internal memory (not shown) of the chip control circuit 23.

The communication protocol setting data items 34a, 34b, 34c, 34d, . . . are setting data items corresponding to various communication protocols for contact less communication which the contact less function chip C realizes (supports). For example, as the communication protocol for contact less communication which the contact less function chip C realizes (supports), a communication protocol (type A, type B or the like) defined by ISO/IEC14443 or a communication protocol whose specification is independently defined in each country is considered.

In the communication protocol setting data section 34, an area in which setting data of an existing communication protocol is previously installed and an area in which setting data of a communication protocol newly downloaded is installed are provided.

In an example of FIG. 3, the communication protocol setting data items 34a, 34b, 34c are the existing communication protocol setting data items previously installed therein. For example, in FIG. 3, the communication protocol setting data 34a is setting data corresponding to a communication protocol of type A of ISO/IEC14443 (which is hereinafter simply referred to as type A). Further, the communication protocol setting data 34b is setting data corresponding to a communication protocol of type B of ISO/IEC14443 (which is hereinafter simply referred to as type B). In addition, the communication protocol setting data 34c is setting data corresponding to a communication protocol whose specification is independently defined in Japan.

As shown in FIG. 3, in the communication protocol setting data section 34, an area in which setting data of a communication protocol newly added is stored is provided. For example, it is assumed that the setting data of the new communication protocol is downloaded into the contact less function chip C via the mobile telephone P. Then, the chip control circuit 23 of the contact less function chip C stores the downloaded setting data of the communication protocol into the communication protocol setting data section 34 as the communication protocol setting data 34d. In this case, the new communication protocol setting data may be acquired from the exterior by use of the mobile telephone P and downloaded into the contact less function chip C.

The communication control circuit 35 includes an RF circuit 41, communication protocol control circuit 42 and the like. The communication control circuit 35 is a circuit which controls contact less communication. The communication control circuit 35 transmits/receives radio waves via the antenna 12 in the mobile telephone P connected via the connector section 26. Further, in the communication control circuit 35, various circuit settings are made according to setting data items of the communication protocols set by the communication protocol setting section 33.

That is, when setting data of the communication protocol set by the communication protocol setting section 33 is supplied, a filter constant, a clock of the logic circuit and the frequency division ratio are set according to the setting data of the communication protocol in the communication control circuit 35. For example, in the RF circuit 41, setting with respect to the gates of transistors is mainly made according to the communication protocol. Further, in the communication protocol control circuit 42, setting of the logic circuit is mainly made according to the communication protocol.

Next, determination of the communication protocol of top priority used for contact less communication in the contact less function chip C is explained.

As described above, setting of the communication protocol for contact less communication into the communication control circuit 35 is made by the communication protocol setting section 33 based on determination by the communication protocol determining section 32. In this case, a case wherein the communication protocol setting section 33 determines the communication protocol of top priority (top-priority protocol) and the communication protocol setting section 33 sets the top-priority protocol in the communication control circuit 35 is explained.

The communication protocol determining section 32 determines the top-priority protocol based on the equipment information 31 acquired from the mobile telephone P and information stored in the equipment information table 22a. Therefore, information items of various conditions are recorded in the equipment information table 22a in order to determine a top-priority protocol with respect to the equipment information 31 of the various types of mobile telephones P. For example, when it is assumed that the device is used in a plurality of countries, information items indicating the top-priority protocols of the respective countries are stored in the equipment information table 22a. Further, when different communication protocols are used according to the type of service or the functions of the mobile telephones P, information items indicating the top-priority protocols corresponding to various types of service or the functions of the mobile telephones P are recorded in the equipment information table 22a.

As shown in FIG. 3, an example of determination for the top-priority protocol is explained by assuming a case wherein communication protocol setting data items of type A, type B and Japanese independent specification 1 are held (that is, the contact less function chip C supports type A, type B and Japanese independent specification 1 as the communication protocol for contact less communication).

For example, if the contact less function chip C or the mobile telephone P can be used in a plurality of countries, the top-priority protocol is determined based on the country's name in the equipment information 31 acquired from the mobile telephone P. For example, if type A is standard in Europe and the Japanese independent specification 1 is standard in Japan, the top-priority protocol of Europe is recorded as type A and the top-priority protocol of Japan is recorded as the Japanese independent specification 1 in the equipment information table 22a. In this case, the communication protocol determining section 32 determines the Japanese independent specification 1 as the top-priority protocol if the country's name in the equipment information 31 acquired from the mobile telephone P is Japan. Further, the communication protocol determining section 32 determines type A as the top-priority protocol if the country's name in the equipment information 31 acquired from the mobile telephone P is Europe.

As a result, it is possible to preferentially set the communication protocol of contact less communication to the Japanese independent specification 1 when the contact less function chip C is mounted in the mobile telephone P in which the country's name of the equipment information 31 is Japan. Likewise, it is possible to preferentially set the communication protocol of contact less communication to type A when the contact less function chip C is mounted in the mobile telephone P in which the country's name of the equipment information 31 is Europe.

Further, when various services are provided by contact less communication by use of different communication protocols, the contact less function chip C can set the priority order of various communication protocols or the top-priority protocol according to the service contents. When various services are provided by various communication protocols, the contact less function chip C is required to set the communication protocol according to the service to be offered. Therefore, in the contact less function chip C, for example, it is possible to set the communication protocol of the service which requires a high-speed response as the top-priority protocol.

For example, an operation condition is assumed in which the first service is provided by contact less communication by use of the communication protocol of the type A and the second service is provided by contact less communication by use of the communication protocol of the Japanese independent specification 1. In this case, the communication protocol of the service which requires a high-speed response (communication) among the first and second services is recorded as the top-priority protocol in the equipment information table 22a. Thus, the communication protocol determining section 32 can determine the service which requires a high-speed response in the equipment information 31 of the mobile telephone as the top-priority protocol.

That is, even in the contact less function chip C which can set a plurality of communication protocols used to offer a plurality of services, communication protocols of contact less communication preferentially realized according to the respective service contents can be set. As a result, even in the contact less function chip C which can set a plurality of communication protocols used to offer a plurality of services, efficient settings of communication protocols can be made and the service can be efficiently provided.

As a concrete example, it is assumed that the contact less function chip mounted on the mobile telephone is used for a passage control function (passage control service, first service) by a passage control device such as an entrance/exit management device or gate control device and a credit card function (fee settlement service, second service) for settlement of the cost of an article or service fee.

Generally, in the passage control function, it is necessary to perform a process of making the determination of permission of passage at high speed (instantaneously) and controlling the passage, for example, closing or opening the gate. On the other hand, in the credit card function, it is possible to perform a fee settlement process by taking a long time for the process in comparison with a case of the passage control function. That is, in the above contact less function chip C, a communication protocol used for the passage control function (first service) is set as the top-priority protocol.

Further, in the above case, for example, a communication protocol of contact less communication used for the passage control function is recorded as the top-priority protocol in the equipment information table 22a. According to information in the equipment information table 22a, the communication protocol determining section 32 determines the communication protocol used for the passage control function as the top-priority protocol.

Further, the communication protocol setting section 33 sets the communication control circuit 35 by use of setting data of the communication protocol used for the passage control function based on determination by the communication protocol determining section 32. Therefore, the contact less function chip C can set the communication control circuit 35 so as to activate the communication protocol used for the communication control function at the earliest possible timing and perform the passage control function at high speed. Further, in the contact less function chip C, the credit card function can be carried out by changing the communication protocols. As a result, in the mobile telephone in which the contact less function chip C is mounted, efficient contact less communication can be realized by use of a plurality of communication protocols.

Next, the procedure of a communication protocol setting process for contact less communication in the contact less function chip C is explained.

Figure 4:
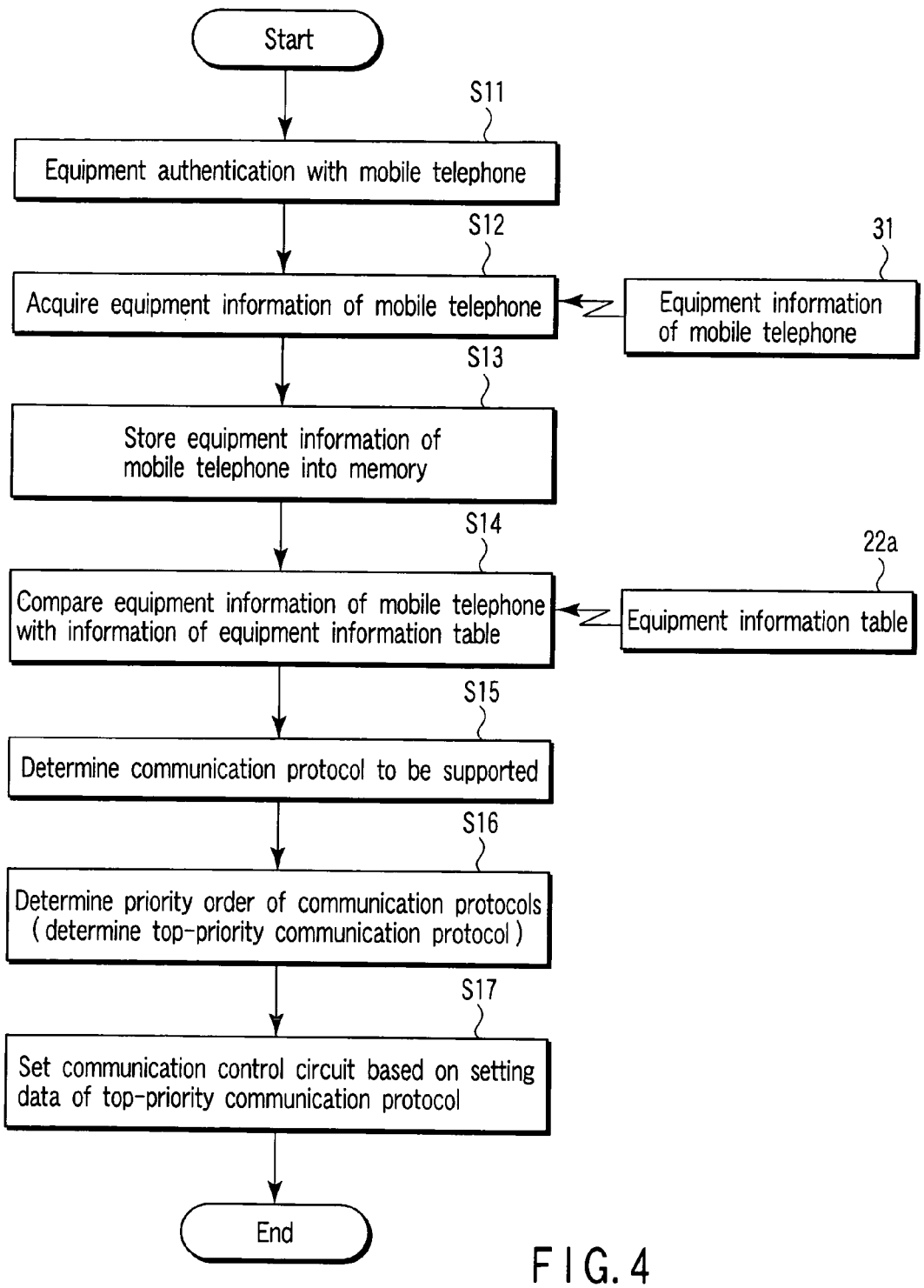
FIG. 4 is a flowchart for illustrating the procedure of the communication protocol setting in the contact less function chip.

FIG. 4 is a flowchart for illustrating the procedure of the communication protocol setting process for contact less communication in the contact less function chip C.

First, when the contact less function chip C is mounted in the socket 13 of the mobile telephone P, the contact less function chip C and the mobile telephone P are physically connected to each other via the contact portion 26 of the contact less function chip C and the socket 13 of the mobile telephone P. In this state, the contact less function chip C and the mobile telephone P are set into the communication possible state. When the contact less function chip C and the mobile telephone P are set into the communication possible state, the CPU 21 of the contact less function chip C and the control circuit 11 of the mobile telephone P perform the mutual authentication process (equipment authentication process) (step S11).

The equipment authentication process is a process of permitting the contact less function chip C and the mobile telephone P to authenticate each other. That is, on the contact less function chip C side, it is confirmed in the equipment authentication process whether or not the mobile telephone P is reliable equipment (a mobile telephone of a specification corresponding to the contact less function chip). Further, on the mobile telephone P side, it is confirmed in the equipment authentication process whether or not the contact less function chip C mounted in the socket 13 is reliable equipment (a contact less function chip of a specification corresponding to the mobile telephone).

When the mutual authentication by the equipment authentication process is completed, the control circuit 11 of the mobile telephone P reads out the equipment information 31 of the mobile telephone P stored in a memory (not shown). When the equipment information 31 of the mobile telephone P is read, the control circuit 11 of the mobile telephone P transmits the read equipment information 31 to the contact less function chip C mounted in the socket 13. In response to this, the contact less function chip C receives the equipment information 31 from the mobile telephone P via the contact communicating section 24 (step S12).

The equipment information 31 of the mobile telephone P may be requested from the contact less function chip C to the mobile telephone P. In this case, the CPU 21 of the contact less function chip C issues a request to the control circuit 11 of the mobile telephone P via the contact communicating section 24 and the control circuit 11 of the mobile telephone P transfers the equipment information 31 in response to the request.

When receiving the equipment information 31 from the mobile telephone P via the contact communicating section 24, the CPU 21 of the contact less function chip C stores the received equipment information 31 in the memory 22 (step S13). When the equipment information 31 from the mobile telephone P is stored in the memory 22, the CPU 21 used as the communication protocol determining section 32 of the contact less function chip C compares information stored in the equipment information table 22a with the equipment information 31 (step S14). In the comparing process, the CPU 21 used as the communication protocol determining section 32 of the contact less function chip C determines a required communication protocol of contact less communication to be supported (step S15).

Further, the CPU 21 used as the communication protocol determining section 32 of the contact less function chip C compares information stored in the equipment information table 22a with the equipment information 31 (step S14) to determine a communication protocol (top-priority protocol) of contact less communication to be preferentially activated (step S16).

The determination results are transmitted to the communication protocol setting section 33 from the communication protocol determining section 32. When receiving the result of determination by the communication protocol determining section 32, the communication protocol setting section 33 performs a communication setting process for contact less communication by use of each communication protocol setting data item of the communication protocol setting data section 34 based on the result of determination by the communication protocol determining section 32. In the communication setting process, the communication protocol setting section 33 makes valid the communication protocol to be supported (prevents an unnecessary communication protocol from being activated) and performs a circuit setting process of the communication control circuit 35 to preferentially activate the top-priority communication protocol.

In the process of setting the top-priority communication protocol, the communication protocol setting section 33 selects setting data of the top-priority communication protocol from the communication protocol setting data section 34 based on determination by the communication protocol determining section 32. When the setting data of the top-priority communication protocol is selected, the communication protocol setting section 33 supplies the selected setting data of the top-priority communication protocol to the communication control circuit 35. Thus, the communication control circuit 35 makes various circuit settings based on the setting data of the top-priority communication protocol (step S17).

It is also possible to determine the priority order of communication protocols based on the equipment information of the mobile telephone and sets a communication protocol for contact less communication based on the priority order. In this case, even when a plurality of communication protocols are supported, optimum communication setting can be made based on the priority order of various communication protocols and contact less communication can be efficiently performed by use of various communication protocols.

As described above, the contact less function chip acquires equipment information from the mobile telephone when it is mounted in the mobile telephone, determines a communication protocol of contact less communication to be preferentially activated based on the equipment information acquired from the mobile telephone and sets the communication control circuit for contact less communication by use of setting data of the top-priority communication protocol.

Thus, when the contact less function chip C performs contact less communication with an external device by use of the antenna 12 of the mobile telephone P, it can preferentially perform contact less communication by use of the top-priority communication protocol and enhance the operation speed of contact less communication by the top-priority communication protocol. As a result, in the mobile telephone in which the contact less function chip C is mounted, contact less communication by the contact less function chip C having various communication protocols can be efficiently performed.

Further, the contact less function chip determines communication protocols which are not used and communication protocols which are required to be supported based on equipment information of the mobile telephone (for example, the maker of the mobile telephone, the model thereof, specification information of the performance and function, local information of a country or region, or service information provided for the user) and sets available communication protocols based on the priority order.

Thus, in the contact less function chip, available communication protocols can be limited according to the specification of the mobile telephone in which the contact less function chip is mounted or the service provided. As a result, with the mobile telephone P in which the contact less function chip C is mounted, the system can be efficiently operated.

If a specified service access right (the right of utilization of the service) is not provided, it is possible to prevent the contact less function chip C from supporting an unnecessary communication protocol.

Further, even when many communication protocols are provided which are required to be supported in order to permit the device to be used in foreign countries, the contact less function chip C can efficiently set the communication protocols of contact less communication.

When a new communication protocol for contact less communication is added to the contact less function chip, the contact less function chip downloads setting data of the new communication protocol from the mobile telephone to add the setting data of the new communication protocol.

Thus, the contact less function chip can support the new communication protocol in future. As a result, even if the new service is carried out by use of the new communication protocol, the new communication protocol can be used for the new service in the mobile telephone P in which the contact less function chip C is mounted.

Further, when a communication protocol which is required to be supported in order to permit the device to be used in a foreign country is added, the contact less function chip can easily cope with this case. As a result, the mobile telephone P in which the contact less function chip C can easily receive services provided by use of different communication protocols in foreign countries.

The equipment information table containing information which is compared with equipment information of the mobile telephone when the communication protocol of contact less communication is determined in the contact less function chip C is provided in the rewritable nonvolatile memory.

Therefore, in the contact less function chip, the communication protocol which is required to be supported and the criterion of the priority order of communication protocols can be easily changed according to a change of a specification of the mobile telephone or a change of the service contents provided.

Next, the communication setting process for contact less communication corresponding to the equipment characteristic of the mobile telephone P or contact less function chip C is explained.

As the mobile telephone P having the antenna 12 for contact less communication by the contact less function chip C as shown in FIG. 1, devices of various specifications are considered. Therefore, the characteristic of the antenna for contact less communication mounted on the mobile telephone P on which the contact less function chip C is mounted may be different depending on the type thereof. Further, the characteristic of the communication control circuit of the contact less function chip C may be different.

Therefore, there occurs a possibility that the communication characteristics will vary depending on the combination of the mobile telephone P (the antenna of the mobile telephone P) and the contact less function chip C (the communication control circuit of the contact less function chip C). In order to attain a preferable performance (the performance of contact less communication) which is required for a service in any combination thereof, it is required to make a communication setting according to the equipment characteristics of various mobile telephones P and the equipment characteristics of various contact less function chips C.

In the present embodiment, a case wherein a communication setting process is performed according to the characteristic of the antenna 12 for contact less communication mounted on the mobile telephone P is explained. Further, in the present embodiment, an example of the communication setting process performed according to the antenna characteristic of the antenna mounted on the mobile telephone is explained by taking a case wherein the antenna characteristic is actually measured and set and a case wherein the antenna characteristic is set based on the equipment information of the mobile telephone as an example.

First, the communication setting process based on the measurement result of the antenna characteristic of the antenna mounted on the mobile telephone P is explained.

A case wherein the characteristic of the antenna 12 on the mobile telephone P is actually measured and the communication setting process is performed according to the measured antenna characteristic is schematically explained.

Figure 5:
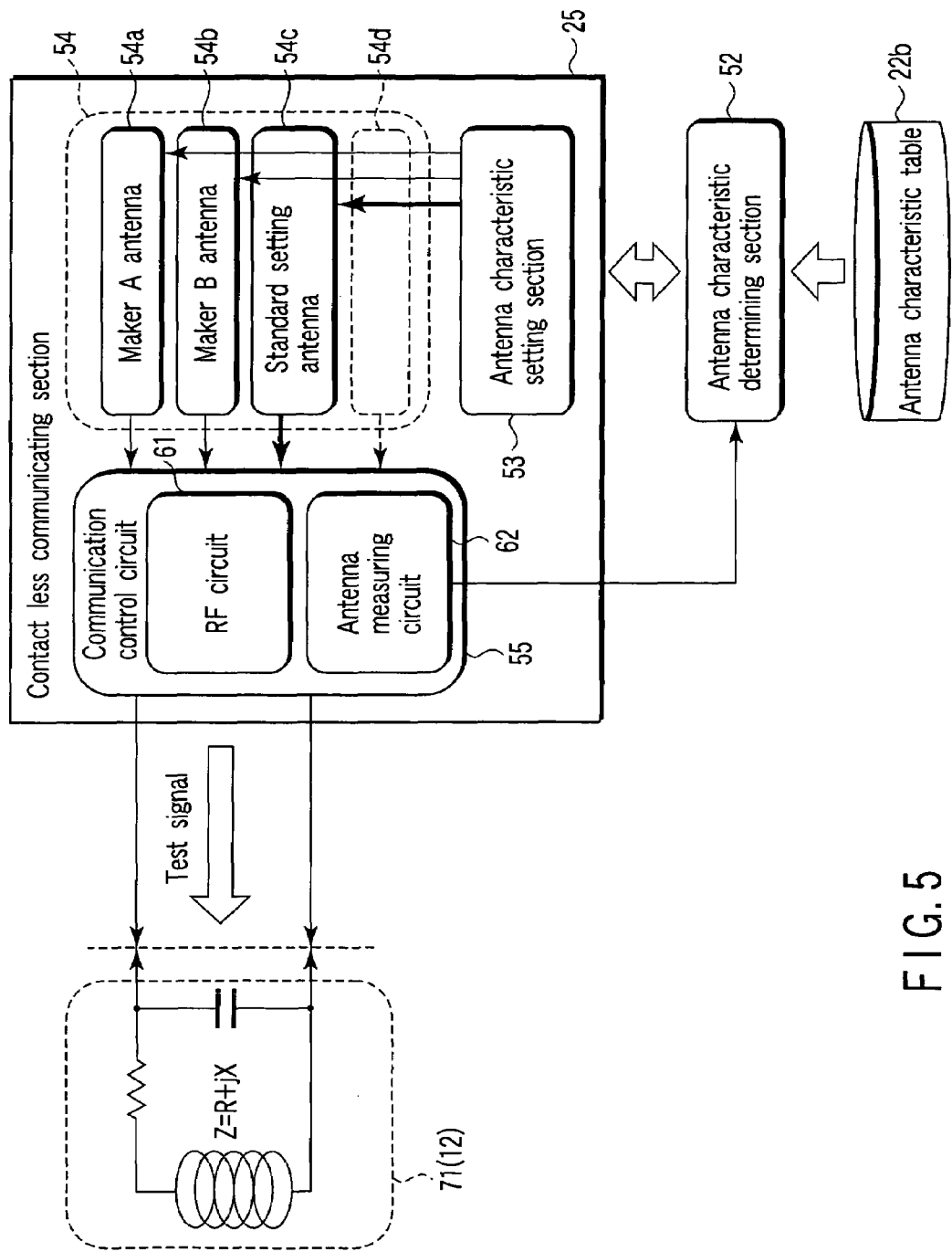
FIG. 5 is a diagram for illustrating an example of the configuration of a contact less function chip which realizes an antenna characteristic setting based on the measurement of antenna characteristics.

FIG. 5 is a diagram schematically showing an example of the configuration of the contact less function chip C which actually measures the characteristic of the antenna 12 mounted on the mobile telephone P and performs the communication setting process according to the antenna characteristic obtained as the measurement result.

As shown in FIG. 5, the contact less function chip C has the configuration to realize communication setting according to the characteristic of the antenna mounted on the mobile telephone P and includes an antenna characteristic table 22b, antenna characteristic determining section (antenna characteristic determining function) 52, antenna characteristic setting section (antenna characteristic setting function) 53, antenna characteristic setting data section 54 and communication control circuit 55.

The antenna characteristic table 22b is previously provided in the memory 22. In the antenna characteristic table 22b, information (data used for determining the antenna characteristic to be set) indicating the antenna characteristic corresponding to measurement data (a value of the equivalent circuit of the antenna) of the antenna characteristic measured by an antenna measurement circuit 62 as will be described later is stored. Further, the antenna characteristic table 22b is configured by a rewritable nonvolatile memory. Therefore, for example, information in the antenna characteristic table 22b can be rewritten according to a change of the service contents at the operation time or a change of the specification of the whole system containing an external device which becomes a communication partner of contact less communication.

The antenna characteristic determining section 52 determines setting contents (setting data corresponding to the antenna characteristic) corresponding to the characteristic of the antenna mounted on the mobile telephone P based on data of the antenna characteristic measured by the antenna measuring circuit 62 and information stored in the antenna characteristic table 22b. For example, the function of the antenna characteristic determining section 52 is realized by the CPU 21 or the chip control circuit 23.

The antenna characteristic setting section 53 performs a setting process according to the characteristic of the antenna for contact less communication mounted on the mobile telephone P. The antenna characteristic setting section 53 performs a setting process for the communication control circuit 55 by use of setting data corresponding to the characteristic of the antenna 12 for contact less communication mounted on the mobile telephone P based on determination by the antenna characteristic determining section 52. For example, the function of the antenna characteristic setting section 53 is realized by the contact less communicating section 25 or chip control circuit 23.

The antenna characteristic setting data section 54 stores various setting data items corresponding to various antenna characteristics set by the antenna characteristic setting section 53. In the example of FIG. 5, the antenna characteristic setting data section 54 stores various setting data items 54a, 54b, 54c, 54d, etc., corresponding to various antenna characteristics. The antenna characteristic setting data section 54 is configured by a rewritable nonvolatile memory. For example, the function of the antenna characteristic setting data section 54 is realized by the memory 22, an internal memory (not shown) of the contact less communicating section 25 or an internal memory (not shown) of the chip control circuit 23.

The setting data items 54a, 54b, 54c, 54d, . . . are setting data corresponding to the types of the characteristics of the antenna mounted on the mobile telephone on which the contact less function chip C may be mounted.

Further, in the antenna characteristic setting data section 54, an area in which setting data corresponding to existing antenna characteristics is previously installed (registered) and an area in which setting data corresponding to a new antenna characteristic is to be installed (registered) are provided.

In the area in which setting data corresponding to the existing antenna characteristic is registered, setting data of the antenna characteristic corresponding to the antenna for contact less communication mounted on the existing mobile telephone (the mobile telephone on which the contact less function chip C may be mounted at the present time) is previously installed. Further, in the area in which setting data corresponding to the new antenna characteristic is to be registered, setting data corresponding to the antenna for contact less communication mounted on a new mobile telephone (the antenna mounted on the new mobile telephone having a characteristic different from that of the antenna mounted on the existing mobile telephone) is installed.

In the example of FIG. 5, the antenna characteristic setting data items 54a, 54b, 54c are setting data items (setting data items corresponding to the existing antenna characteristics) corresponding to the antenna 12 for contact less communication mounted on the existing mobile telephone P in which the respective setting data items are previously installed. For example, in FIG. 5, the setting data 54a is setting data corresponding to the antenna of a maker A (or the antenna for contact less communication mounted on the mobile telephone of the maker A). Further, the setting data 54b is setting data corresponding to the antenna of a maker B (or the antenna for contact less communication mounted on the mobile telephone of the maker B). The setting data 54c is setting data corresponding to the antenna of the standard specification (or the antenna mounted on the mobile telephone of the standard specification).

In FIG. 5, setting data (setting data corresponding to the new antenna characteristic) corresponding to the antenna for contact less communication mounted on the new mobile telephone P is held in the antenna characteristic setting data section 54. For example, if setting data of the new antenna characteristic is downloaded into the contact less function chip C, the setting data of the antenna characteristic is stored as the antenna characteristic setting data 54d. Further, the setting data corresponding to the antenna for contact less communication mounted on the new mobile telephone is acquired by the mobile telephone P from the exterior and then downloaded from the mobile telephone P into the contact less function chip C, for example.

The communication control circuit 55 has an RF circuit 61 and antenna measuring circuit 62. Like the communication control circuit 35, the communication control circuit 55 is a circuit which controls contact less communication. The communication control circuit 55 transmits/receives radio waves via the antenna 12 in the mobile telephone P connected via the connector portion. Further, in the communication control circuit 55, various circuit settings are made by use of setting data corresponding to the antenna characteristic set by the antenna characteristic setting section 53.

That is, in the communication control circuit 55, a filter constant, the logic of the logic circuit, the frequency dividing ratio and the like are set according to setting data of the antenna characteristic set by the antenna characteristic setting section 53. For example, in the RF circuit 61, a setting for the gate of the transistor corresponding to the antenna characteristic is mainly made.

Further, the antenna measuring circuit 62 measures the characteristic of the antenna of contact less communication mounted on the mobile telephone P. In the antenna measuring circuit 62, for example, a value of the equivalent circuit of the antenna 12 is measured as data indicating the antenna characteristic by outputting a test signal to the antenna 12. Further, the antenna measuring circuit 62 supplies data indicating the measured antenna characteristic to the antenna characteristic determining section 52.

Next, the measurement of the antenna characteristic by the antenna measuring circuit 62 is explained.

As described above, the communication control circuit 55 in the contact less function chip C is physically connected to the antenna 12 in a state in which the contact less function chip C is mounted in the mobile telephone P.

The antenna measuring circuit 62 measures the characteristic (antenna characteristic) of the antenna 12 in a state in which the communication control circuit 55 is connected to the antenna 12. For example, the antenna measuring circuit 62 measures the value of an equivalent circuit 71 of the antenna 12 as the characteristic of the antenna 12. Generally, a value $Z$ of the equivalent circuit of an antenna is expressed by $Z=R+jX$. Therefore, the antenna measuring circuit 62 measures a value which satisfies the equation expressing the value of the equivalent circuit 71 as the antenna characteristic of the antenna 12 by supplying a test signal to the antenna 12.

Specifically, the antenna measuring circuit 62 supplies currents having different frequencies and current values as test signals to the antenna 12. The antenna measuring circuit 62 detects the value of the equivalent circuit 71 expressed by the above equation as measurement data based on a signal generated in response to the test signal. The above measurement data is supplied as data indicating the characteristic of the antenna 12 to the antenna characteristic determining section 52.

Next, determination of the antenna characteristic based on the measurement data of the antenna characteristic by the antenna measuring circuit 62 is explained.

The antenna characteristic determining section 52 determines setting data to be set based on measurement data of the antenna characteristic by the antenna measuring circuit 62 and information recorded in the antenna characteristic table 22b. Further, in the antenna characteristic table 22b, information which is used to determine setting data to be set in the communication control circuit 55 based on the measurement data (measured antenna characteristic) of the equivalent circuit 71 of the antenna 12 by the antenna measuring circuit 62 is recorded.

For example, as shown in FIG. 5, data of the equivalent circuit for the antenna 12 of the mobile telephone of each maker is recorded in the antenna characteristic table 22b in a case where setting data items corresponding to the antenna characteristics are set for the respective makers. In this case, the antenna characteristic determining section 52 compares data (measurement data) of the equivalent circuit 71 of the antenna 12 measured with data of the equivalent circuit stored in the antenna characteristic table 22b to determine a maker of the antenna having a value which is the same as or nearest to the measurement data. The determination result is supplied to the antenna characteristic setting section 53. Thus, in the antenna characteristic setting section 53, the antenna characteristic setting data 54a, . . . of the maker determined by the antenna characteristic determining section 52 is selected and the thus selected antenna characteristic setting data can be set in the communication control circuit 55.

As a concrete example, as shown in FIG. 5, it is assumed that setting data items corresponding to the antenna of maker A, the antenna of maker B and the antenna of the standard setting are stored in the antenna characteristic setting data section 54, that is, the contact less function chip C supports the antenna of maker A, the antenna of maker B and the antenna of the standard setting as the antenna for contact less communication.

For example, if the measurement data measured by the antenna measuring circuit 62 is most closely related to data of the antenna of maker A stored in the antenna characteristic table 22b, the antenna characteristic determining section 52 determines that the antenna characteristic of the mobile telephone P is nearest to the antenna characteristic of maker A. Then, the antenna characteristic determining section 52 determines that the setting data 54a corresponding to the antenna characteristic of maker A should be applied as setting data corresponding to the antenna characteristic of the mobile telephone P.

Further, if the measurement data measured by the antenna measuring circuit 62 is most closely related to data of the antenna of maker B stored in the antenna characteristic table 22b, the antenna characteristic determining section 52 determines that the antenna characteristic of the mobile telephone P is nearest to the antenna characteristic of maker B. Then, the antenna characteristic determining section 52 determines that the setting data 54b corresponding to the antenna characteristic of maker B should be applied as setting data corresponding to the antenna characteristic of the mobile telephone P.

In addition, if the measurement data measured by the antenna measuring circuit 62 is most closely related to data of standard setting stored in the antenna characteristic table 22b, the antenna characteristic determining section 52 determines that the antenna characteristic of the mobile telephone is nearest to the characteristic of the antenna of standard setting. In this case, the antenna characteristic determining section 52 determines that the setting data 54c corresponding to the characteristic of the antenna of standard setting should be applied as setting data corresponding to the antenna characteristic of the mobile telephone P.

As a result, when the contact less function chip C is mounted on the mobile telephone P, it can make a setting for the communication control circuit 55 corresponding to the antenna characteristic of the antenna 12 for contact less communication mounted on the mobile telephone P.

Next, the procedure of a communication setting process based on measurement data of the antenna characteristic of the antenna 12 in the contact less function chip C is explained.

Figure 6:
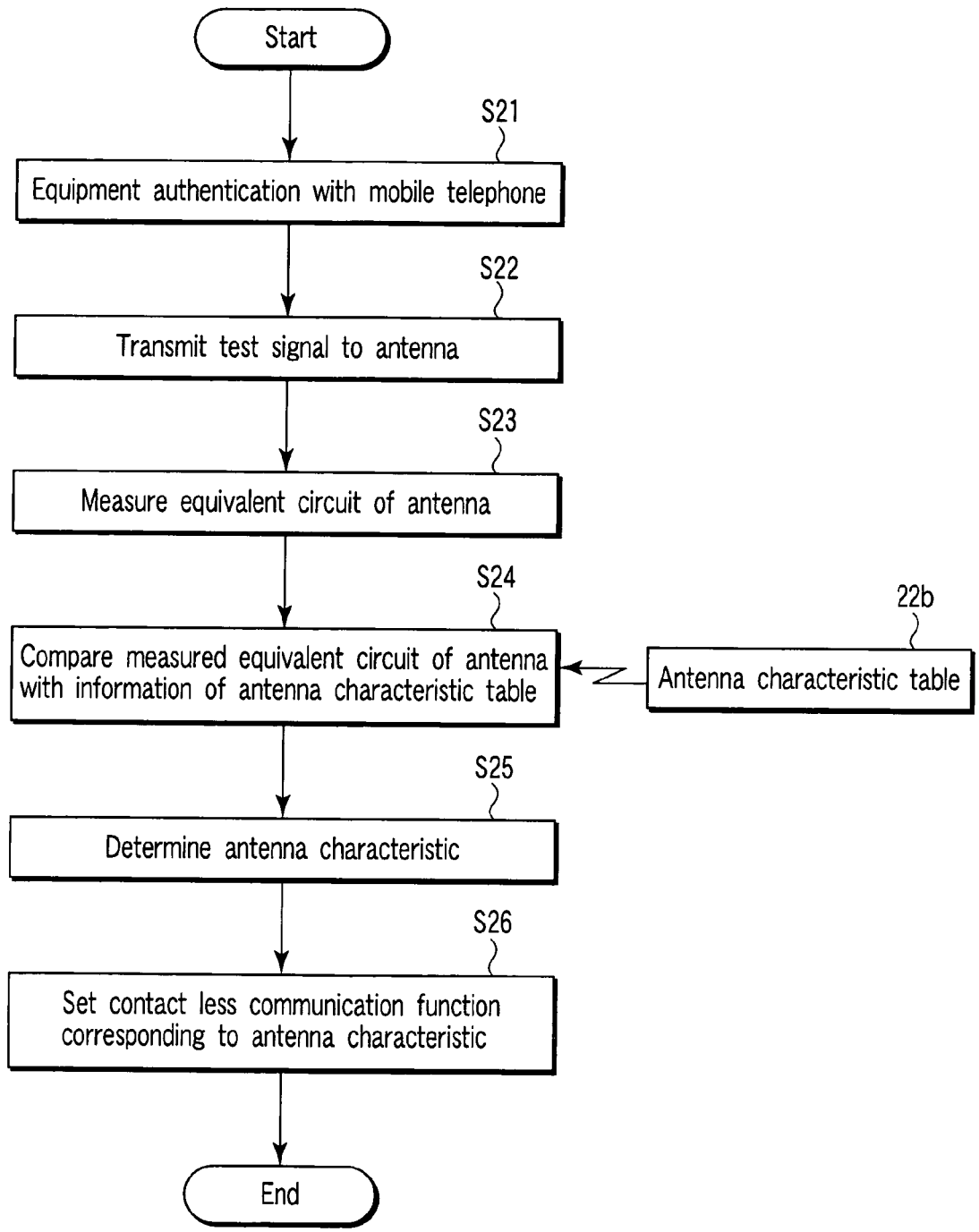
FIG. 6 is a flowchart for illustrating the procedure of the antenna characteristic setting based on the measurement of antenna characteristics in the contact less function chip.

FIG. 6 is a flowchart for illustrating the communication setting process based on measurement data of the antenna characteristic in the contact less function chip C.

First, when the contact less function chip C is mounted on the socket 13 of the mobile telephone P, the contact less function chip C and mobile telephone P are brought into physical contact with each other via the contact portion 26 of the contact less function chip C and the socket 13 of the mobile telephone P. At this time, the communication control circuit 55 of the contact less function chip C and the antenna 12 of the mobile telephone P are physically connected to each other. Then, the contact less function chip C and mobile telephone P are set into a state in which contact communication can be performed. In this state, the CPU 21 of the contact less function chip C and the control circuit 11 of the mobile telephone P perform the mutual authentication process (equipment authentication process) (step S21). In this case, if the equipment authentication process is completed by another process (for example, the communication protocol setting process), step S21 is omitted.

When the equipment authentication is completed by the equipment authentication process, the contact less communicating section 25 of the contact less function chip C makes a communication setting according to the antenna characteristic of the antenna 12 mounted on the mobile telephone P. In this case, first, the antenna measuring circuit 62 of the communication control circuit 55 measures the antenna characteristic (a value of the equivalent circuit of the antenna) of the antenna 12 mounted on the mobile telephone P. At the time of measurement of the antenna characteristic, the antenna measuring circuit 62 transmits various test signals to the antenna 12 (step S22). The antenna measuring circuit 62 derives a value of the equivalent circuit of the antenna 12 as the antenna characteristic of the antenna 12 based on outputs from the antenna 12 in response to the test signals (step S23). The value of the equivalent circuit as the antenna characteristic of the antenna 12 derived based on the test signal is supplied as measurement data to the CPU 21 used as the antenna characteristic determining section 52 from the antenna measuring circuit 62.

In the antenna characteristic determining section 52, measurement data from the antenna measuring circuit 62 is compared with data stored in the antenna characteristic table (step S24) so as to determine setting data according to the antenna characteristic of the antenna 12 (step S25).

The result of determination by the antenna characteristic determining section 52 is supplied from the antenna characteristic determining section 52 to the antenna characteristic setting section 53. In the antenna characteristic setting section 53, setting data 54a, etc., corresponding to the antenna characteristic of the mobile telephone is selected from the antenna characteristic setting data section 54 based on the result of determination of the antenna characteristic by the antenna characteristic determining section 52. Further, in the antenna characteristic setting section 53, a circuit setting for the communication control circuit 55 is made by use of the selected setting data (step S26). Thus, in the communication control circuit 55, various circuit settings are made based on setting data corresponding to the antenna characteristic.

According to the communication setting process based on the measurement of the antenna characteristic, the contact less function C measures the characteristic of the antenna for contact less communication mounted on the mobile telephone, compares the measurement data with data stored in the antenna characteristic table to determine the characteristic of the antenna mounted on the mobile telephone, selects setting data corresponding to the antenna characteristic based on the determination and makes a communication setting for the communication control circuit which performs contact less communication based on the selected setting data.

Thus, the contact less function chip C can make settings according to the characteristic of the antenna mounted on the mobile telephone and realize stable contact less communication even in a case where antenna characteristics are different depending on the types of the mobile telephones.

Further, in the contact less function chip C, plural types of test signals are supplied to the antenna for contact less communication mounted on the mobile telephone so as to measure data of the equivalent circuit of the antenna based on outputs in response to the test signals. Thus, optimum communication settings can be made for antennas of various characteristics.

Further, in the contact less function chip C, if a new antenna with a characteristic different from that of the existing antenna appears, setting data corresponding to the characteristic of the new antenna is downloaded from the mobile telephone and installed (registered) into the antenna characteristic setting data section. As a result, if a new antenna with a characteristic different from that of the existing antenna appears in future, communication settings for the new antenna can be easily realized.

Further, in the contact less function chip C, the antenna characteristic table in which information used to determine the antenna characteristic is stored is provided in a rewritable nonvolatile memory. Thus, the criterion for the antenna characteristic can be easily changed if an antenna with a characteristic different from that of the existing antenna appears or if it is desired to change the setting contents corresponding to the antenna characteristic.

Next, a case wherein a communication setting for the antenna characteristic is made based on equipment information of the mobile telephone is explained.

Figure 7:
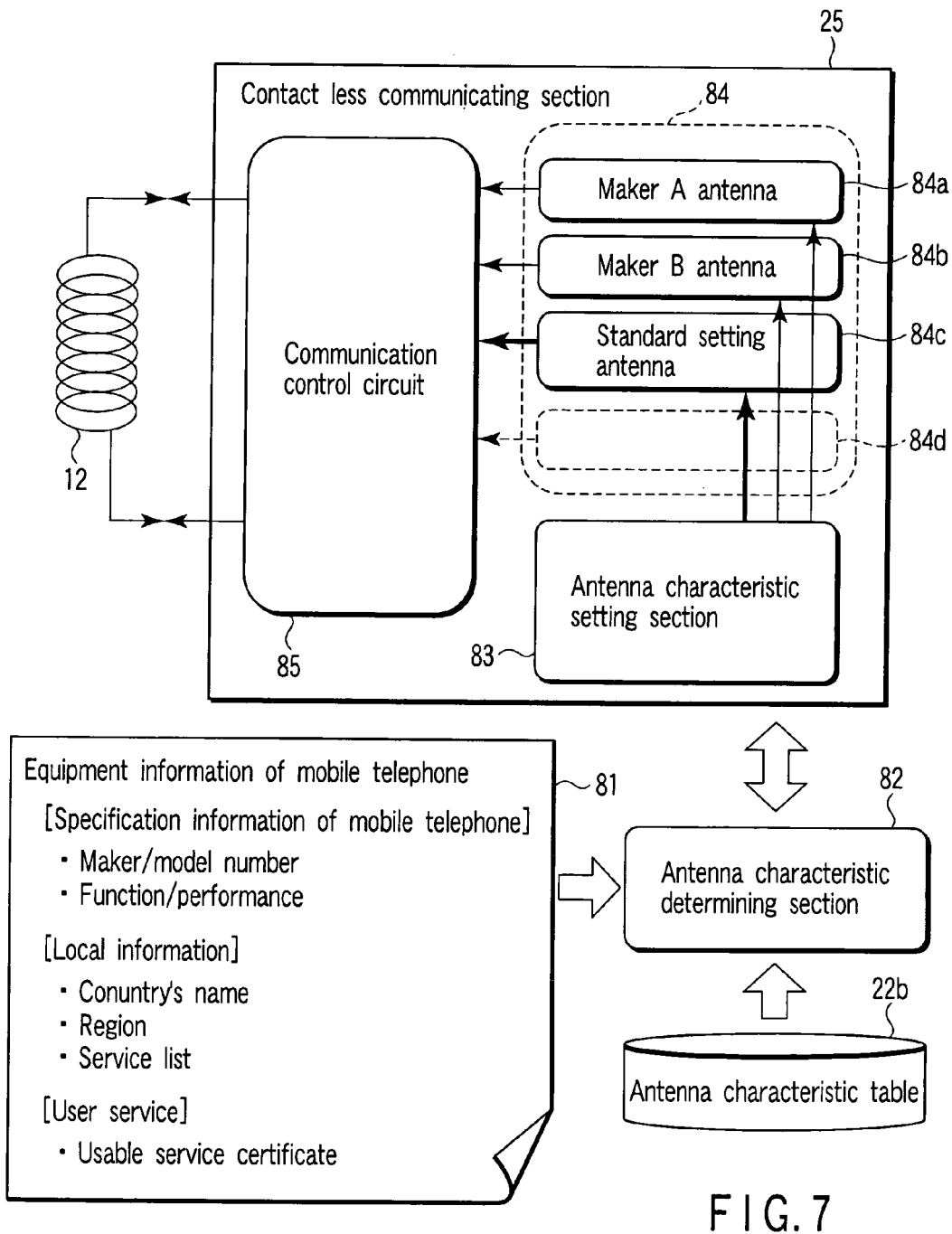
FIG. 7 is a diagram for illustrating an example of the configuration of a contact less function chip which realizes an antenna characteristic setting based on equipment information of a mobile telephone.

FIG. 7 is a diagram schematically showing an example of the configuration of the contact less function chip C which makes a communication setting corresponding to the antenna characteristic based on equipment information 81 of the mobile telephone P.

As shown in FIG. 7, the contact less function chip C has the configuration which makes a communication setting corresponding to the characteristic of the antenna mounted on the mobile telephone P and includes an antenna characteristic table 22b, antenna characteristic determining section (antenna characteristic determining function) 82, antenna characteristic setting section (antenna characteristic setting function) 83, antenna characteristic setting data section 84 and communication control circuit 85.

Like the equipment information 31, the equipment information 81 is information obtained from the mobile telephone P by use of the contact communicating section 24. When the contact less function chip C is mounted on the mobile telephone P, it receives the equipment information 81 from the mobile telephone P by use of the contact communicating section 24. The equipment information 81 obtained from the mobile telephone P by use of the contact communicating section 24 is recorded in the memory 22.

As the equipment information 81, for example, as shown in FIG. 7, specification information of the mobile telephone, local information or user service information is provided. As the specification information of the mobile telephone, for example, information such as a maker's name, model number, function or performance is provided. As the local information, for example, information such as a country's name, region, service list is provided. As the user service information, for example, information of a usable service certificate (electronic certificate) is provided. When only the communication setting corresponding to the antenna characteristic is made, data used to determine the antenna characteristic may be contained in the equipment information 81.

The antenna characteristic table 22b is previously provided in the memory 22. The antenna characteristic table 22b stores information (data used to determine an antenna to be set) which indicates the antenna characteristic corresponding to the equipment information 81 acquired from the mobile telephone P. Further, the antenna characteristic table 22b is provided in a rewritable nonvolatile memory as described before. Therefore, information in the antenna characteristic table 22b can be rewritten according to a change of the specification of the whole system containing an external device which is used as a communication partner of contact less communication or a change of the service contents at the operation time, for example.

The antenna characteristic determining section 82 determines setting contents corresponding to the characteristic of the antenna mounted on the mobile telephone (setting data corresponding to the characteristic of the antenna for contact less communication mounted on the mobile telephone) based on the equipment information 81 acquired from the mobile telephone P and information stored in the antenna characteristic table 22b. The antenna characteristic determining section 82 has a function attained by use of the CPU 21 or chip control circuit 23, for example.

The antenna characteristic setting section 83 makes a communication setting corresponding to the characteristic of the antenna 12 for contact less communication mounted on the mobile telephone P. In the antenna characteristic setting section 83, a setting process is performed with respect to the communication control circuit 85 by use of setting data corresponding to the characteristic of the antenna 12 for contact less communication mounted on the mobile telephone P based on determination by the antenna characteristic determining section 82. For example, the antenna characteristic setting section 83 has a function attained by use of the CPU 21 or chip control circuit 23.

The antenna characteristic setting data section 84 stores various setting data items corresponding to the characteristics of various antennas set by the antenna characteristic setting section 83. In the example shown in FIG. 7, the antenna characteristic setting data section 84 stores various setting data items 84a, 84b, 84c, 84d, etc., corresponding to the characteristics of various antennas. The antenna characteristic setting data section 84 is configured by a rewritable nonvolatile memory. For example, the antenna characteristic setting data section 84 is realized by the memory 22, an internal memory (not shown) of the contact less communicating section 25 or an internal memory (not shown) of the chip control circuit 23.

The various setting data items 84a, 84b, 84c, 84d, . . . are various setting data items corresponding to the characteristics of antennas mounted on various mobile telephones on which the contact less function chip C may be mounted.

Further, in the antenna characteristic setting data section 84, an area in which setting data corresponding to the characteristic of the antenna mounted on the existing mobile telephone is installed (registered) and an area in which setting data corresponding to the antenna characteristic of a new mobile telephone is to be installed (registered) are provided.

In the area in which setting data corresponding to the characteristic of the existing antenna is registered, setting data corresponding to an antenna for contact less communication mounted on the existing mobile telephone (or the mobile telephone on which the contact less function chip C can be mounted at present) is previously installed (registered). Further, in the area in which setting data corresponding to the antenna characteristic of a new mobile telephone is to be registered, setting data corresponding to an antenna for contact less communication mounted on a new mobile telephone (or a mobile telephone having an antenna characteristic different from the existing antenna characteristic) is installed.

Like the example of FIG. 5, in the example of FIG. 7, the antenna characteristic setting data items 84a, 84b, 84c are setting data items corresponding to the antenna 12 for contact less communication mounted on the existing mobile telephone P in which the respective setting data items are previously installed. For example, in FIG. 7, the setting data 84a is setting data corresponding to the antenna of a maker A (or the antenna for contact less communication mounted on the mobile telephone of the maker A). Further, the setting data 84b is setting data corresponding to the antenna of a maker B (or the antenna for contact less communication mounted on the mobile telephone of the maker B). The setting data 84c is setting data corresponding to the antenna of the standard specification (or the antenna for contact less communication mounted on the mobile telephone of the standard specification).

Like the example of FIG. 5, in the example of FIG. 7, the setting data 84d is stored as setting data corresponding to the antenna for contact less communication mounted on the new mobile telephone is held in the antenna characteristic setting data section 84. For example, if setting data corresponding to the new antenna characteristic is downloaded into the contact less function chip C, the setting data corresponding to the antenna characteristic is stored as the setting data 84d. Further, the setting data corresponding to the antenna for contact less communication mounted on the new mobile telephone is acquired by the mobile telephone P from the exterior and then downloaded from the mobile telephone P into the contact less function chip C, for example.

Like the communication control circuits 35 and 55, the communication control circuit 85 is a circuit which controls contact less communication. The communication control circuit 85 transmits or receives radio waves via the antenna 12 mounted on the mobile telephone P connected to the connector portion. Further, like the communication control circuit 55, in the communication control circuit 85, various circuit settings are made by use of setting data corresponding to the antenna characteristic set by the antenna characteristic setting section 83.

Next, determination of the antenna characteristic based on the equipment information 81 of the mobile telephone P is explained.

The antenna characteristic determining section 82 determines setting data to be set based on the equipment information 81 acquired from the mobile telephone P and information recorded in the antenna characteristic table 22b. Therefore, information used to determine setting data to be set into the communication control circuit 85 based on the equipment information 81 acquired from the mobile telephone P is stored in the antenna characteristic table 22b.

For example, as shown in FIG. 7, when setting data corresponding to the antenna characteristic is set for each maker, data associated with the antenna of each maker or the antenna 12 mounted on the mobile telephone of each maker is stored in the antenna characteristic table 22b. In this case, the antenna characteristic determining section 82 compares the equipment information 81 acquired from the mobile telephone P with data stored in the antenna characteristic table 22b to determine a maker of the antenna (or a maker of the mobile telephone) corresponding to the equipment -information 81. The determination result is supplied to the antenna characteristic setting section 83. Thus, in the antenna characteristic setting section 83, setting data items 54a, etc., corresponding to the antenna of the maker determined by the antenna characteristic determining section 82 can be set in the communication control circuit 85.

As a concrete example, as shown in FIG. 7, it is assumed that setting data items corresponding to the antenna of maker A, the antenna of maker B and the antenna of the standard specification are held in the antenna characteristic setting data section 84, that is, the contact less function chip C supports the antenna of maker A, the antenna of maker B and the antenna of standard setting as the antenna 12 for contact less communication.

For example, when the equipment information 81 of the mobile telephone coincides with data of maker A stored in the antenna characteristic table 22b, the antenna characteristic determining section 82 determines the antenna of the mobile telephone P as the antenna of maker A. In this case, the antenna characteristic determining section 82 determines that the setting data 84a corresponding to the characteristic of the antenna of maker A should be applied as setting data corresponding to the antenna characteristic of the mobile telephone P.

Further, when the equipment information 81 of the mobile telephone coincides with data of maker B stored in the antenna characteristic table 22b, the antenna characteristic determining section 82 determines the antenna of the mobile telephone P as the antenna of maker B. In this case, the antenna characteristic determining section 82 determines that the setting data 84b corresponding to the characteristic of the antenna of maker B should be applied as setting data corresponding to the antenna characteristic of the mobile telephone P.

When the equipment information 81 of the mobile telephone coincides with data of standard setting stored in the antenna characteristic table 22b, the antenna characteristic determining section 82 determines the antenna of the mobile telephone P as the antenna of standard setting. In this case, the antenna characteristic determining section 82 determines that the setting data 84c corresponding to the characteristic of the antenna of standard setting should be applied as setting data corresponding to the antenna characteristic of the mobile telephone P.

As a result, when the contact less function chip C is mounted on the mobile telephone P, a setting for the communication control circuit 35 corresponding to the antenna characteristic of the antenna 12 for contact less communication mounted on the mobile telephone P can be made.

Next, the procedure of a communication setting process corresponding to the antenna characteristic based on the equipment information of the mobile telephone in the contact less function chip C is explained.

Figure 8:
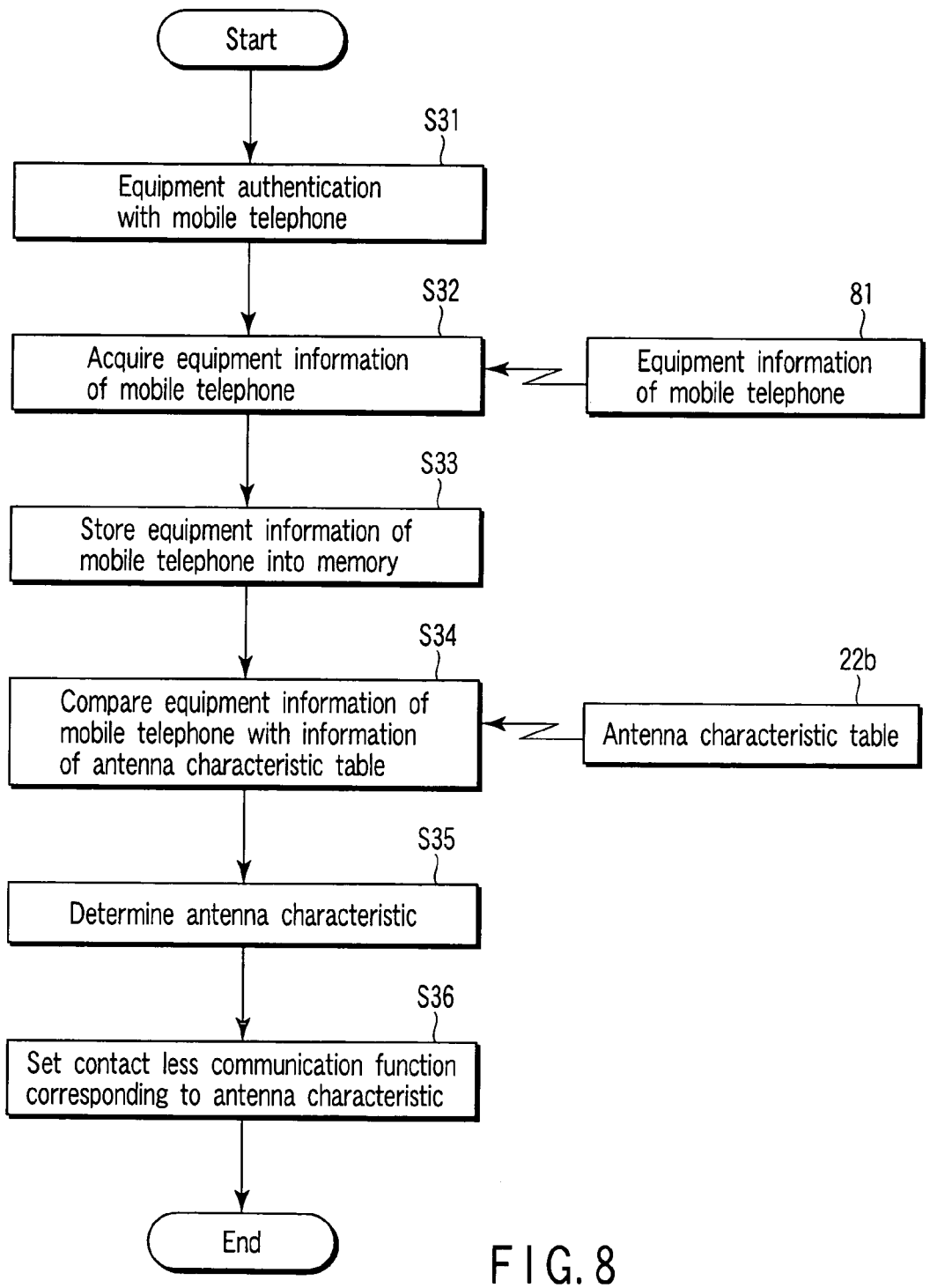
FIG. 8 is a flowchart for illustrating the procedure of the antenna characteristic setting based on equipment information of the mobile telephone in the contact less function chip.

FIG. 8 is a flowchart for illustrating the communication setting process corresponding to the antenna characteristic based on the equipment information of the mobile telephone in the contact less function chip C.

First, when the contact less function chip C is mounted on the socket 13 of the mobile telephone P, the contact less function chip C and mobile telephone P are brought into physical contact with each other via the contact portion 26 of the contact less function chip C and the socket 13 of the mobile telephone P. At this time, the communication control circuit 35 of the contact less function chip C and the antenna 12 of the mobile telephone P are physically connected to each other. Then, the contact less function chip C and mobile telephone P are set into a state in which contact communication can be performed. In this state, the CPU 21 of the contact less function chip C and the control circuit 11 of the mobile telephone P perform the mutual authentication process (equipment authentication process) (step S31). In this case, if the equipment authentication process is completed by another process (for example, the communication protocol setting process), step S31 is omitted.

When the equipment authentication is completed by the equipment authentication process, the contact less communicating section 25 of the contact less function chip C makes a communication setting according to the antenna characteristic of the antenna 12 of the mobile telephone P. In this case, first, the control circuit 11 of the mobile telephone P reads out the equipment information 81 of the mobile telephone P stored in a memory (not shown). When the equipment information 81 of the mobile telephone P is read out, the control circuit 11 of the mobile telephone P transmits the information to the contact less function chip C mounted on the socket 13 by contact communication. Then, the contact less function chip C receives the equipment information 81 from the mobile telephone P via the contact communication section 24 (step S32). The equipment information 81 of the mobile telephone P can be attained by issuing a request from the contact less function chip C to the mobile telephone P. In this case, the CPU 21 of the contact less function chip C issues a request for equipment information to the control circuit 11 of the mobile telephone P via the contact communicating section 24. The control circuit 11 of the mobile telephone P transfers the equipment information 81 to the contact less function chip C in response to the above request.

When receiving the equipment information 81 from the mobile telephone P via the contact less communicating section 24, the CPU 21 of the contact less function chip C stores the received equipment information 81 in the memory 22 (step S33). When the equipment information 81 of the mobile telephone P is stored in the memory 22, the CPU 21 used as the antenna characteristic determining section 82 of the contact less function chip C compares the equipment information 81 acquired from the mobile telephone P with information stored in the antenna characteristic table 22b (step S34) to determine the antenna characteristic of the antenna 12 (the maker of the antenna or the maker of the mobile telephone in the example of FIG. 7) (step S35).

The determination result by the antenna characteristic determining section 82 is supplied from the antenna characteristic determining section 82 to the antenna characteristic setting section 83. In the antenna characteristic setting section 83, setting data 54a, etc., corresponding to the antenna characteristic (the maker of the antenna or the maker of the mobile telephone in the example of FIG. 7) is selected from the antenna characteristic setting data section 84 based on the determination result of the antenna characteristic (the maker of the antenna or the maker of the mobile telephone in the example of FIG. 7) by the antenna characteristic determining section 82. Further, in the antenna characteristic setting section 83, a circuit setting for the communication control circuit 85 is made by use of the selected setting data (step S36). Thus, in the communication control circuit 85, various circuit settings are made based on setting data corresponding to the antenna characteristic (the maker of the antenna or the maker of the mobile telephone in the example of FIG. 7).

As described above, according to the communication setting process based on the equipment information of the mobile telephone, the contact less function chip acquires equipment information from the mobile telephone, compares the equipment information acquired from the mobile telephone with data stored in the antenna characteristic table to determine the characteristic (or the maker) of the antenna of the mobile telephone, selects setting data corresponding to the antenna characteristic based on the determination and makes a communication setting for the communication control circuit which performs the contact less communication function based on the selected setting data.

As a result, in the contact less function chip, a setting corresponding to the characteristic of the antenna mounted on the mobile telephone can be easily made and stable contact less communication can be realized even when the antenna characteristic is different depending on the type of the mobile telephone.

Further, in the contact less function chip, the antenna characteristic is determined and set based on the equipment information of the mobile telephone. Therefore, a communication setting based on optimum setting data can be easily made based on setting data previously prepared according to the maker of the mobile telephone or the maker of the antenna.

In the contact less function chip, when a new antenna having a characteristic different from the existing antenna characteristic appears, setting data corresponding to the characteristic of the new antenna is downloaded from the mobile telephone and installed (registered) into the antenna characteristic setting data section. Thus, even when an antenna having a characteristic different from the existing antenna characteristic appears, a communication setting corresponding to the characteristic of the new antenna can be easily realized.

Further, in the contact less function chip, the antenna characteristic table in which information used to determine the antenna characteristic (the maker of the antenna or the maker of the mobile telephone) is stored can be configured by a rewritable nonvolatile memory. Therefore, even when an antenna having a characteristic different from the existing antenna characteristic appears or it is desired to change a setting corresponding to the antenna characteristic, a criterion used to determine the antenna characteristic (the maker of the antenna or the maker of the mobile telephone) can be easily changed.

In the above embodiment, a case wherein the equipment information of the mobile telephone is acquired and the communication setting corresponding to the communication protocol, antenna characteristic or the like is made based on the equipment information is explained. However, the present embodiment is not limited to the above case. For example, it is possible for a chip mounted on the mobile telephone to acquire equipment information of the mobile telephone, determine various settings other than communication setting corresponding to service applications or the specification of the mobile telephone based on the equipment information of the mobile telephone and make various settings based on the determination.

According to the above embodiment, the communication setting for contact less communication can be set to an optimum setting according to the application or specification of the portable terminal equipment, a high-speed communication process can be attained, the communication efficiency can be enhanced and optimization of the communication characteristic can be attained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device which is removably mounted on portable terminal equipment, the electronic device comprising:
   a communication control circuit configured to perform radio communications with an external device in a state in which the electronic device is mounted on the portable terminal equipment;
   a determining section configured to determine setting contents for the communication control circuit corresponding to the portable terminal equipment on which the electronic device is mounted;
   a setting section configured to make settings for the communication control circuit based on the setting contents determined by the determining section; and
   a communicating section configured to perform data communications with the portable terminal equipment on which the electronic device is mounted,
   wherein the determining section determines setting contents corresponding to a communication protocol used for radio communication by the communication control circuit based on equipment information acquired from the portable terminal equipment by use of the communicating section, and
   wherein the setting section sets a communication protocol for the communication control circuit based on the setting contents corresponding to the communication protocol determined by the determining section.

2. The electronic device according to claim 1, further comprising a memory which stores a plurality of setting data items corresponding to various communication protocols used to perform radio communication by the communication control circuit,
   wherein the determining section determines, setting contents corresponding to a communication protocol used for radio communication by the communication control circuit based on equipment information acquired from the portable terminal equipment, and the setting section makes a setting for the communication control circuit based on setting data determined by the determining section.

3. The electronic device according to claim 2, wherein setting data of a new communication protocol acquired from the portable terminal equipment is registered in the memory when setting data of the new communication protocol used for radio communication by the communication control circuit is acquired from the portable terminal equipment by use of the communicating section.

4. The electronic device according to claim 1, wherein the determining section determines one of a plurality of communication protocols which is realized as a top-priority communication protocol and used for radio communication by the communication control circuit based on equipment information acquired from the portable terminal equipment by use of the communicating section, and the setting section makes a setting for the communication control circuit to enhance the operation speed of the radio communication using the top-priority communication protocol determined by the determining section.

5. The electronic device according to claim 1, wherein the determining section determines a required one of various communication protocols used for radio communication by the communication control circuit based on equipment information acquired from the portable terminal equipment by use of the communicating section, and the setting section makes a setting for the communication control circuit to make only the required communication protocol determined by the determining section usable.

6. The electronic device according to claim 1, wherein the radio communication performed by the communication control circuit is a short-range radio communication.

7. An electronic device which is removably mounted on portable terminal equipment, the electronic device comprising:
   a communication control circuit which performs radio communication with an external device in a state in which the electronic device is mounted on the portable terminal equipment,
   a determining section which determines setting contents for the communication control circuit corresponding to the portable terminal equipment on which the electronic device is mounted, and
   a setting section which makes settings for the communication control circuit based on the setting contents determined by the determining section,
   wherein the communication control circuit performs radio communications with an external device by use of an antenna mounted on the portable terminal equipment on which the electronic device is mounted, the determining section determines setting contents corresponding to the characteristic of the antenna mounted on the portable terminal equipment on which the electronic device is mounted, and the setting section makes a setting for the communication control circuit based on setting contents corresponding to the characteristic of the antenna mounted on the portable terminal equipment and determined by the determining section.

8. The electronic device according to claim 7, further comprising a memory which stores setting data items corresponding to the characteristics of various antennas mounted on various portable terminal equipments,
   wherein the determining section determines setting contents corresponding to the characteristic of the antenna mounted on the portable terminal equipment on which the electronic device is mounted, and the setting section makes a setting for the communication control circuit based on the setting data determined by the determining section.

9. The electronic device according to claim 8, further comprising a communicating section which performs data communication with the portable terminal equipment on which the electronic device is mounted, wherein setting data acquired from the portable terminal equipment is registered into the memory when new setting data different from the setting data already stored in the memory is acquired from the portable terminal equipment via the communicating section.

10. The electronic device according to claim 7, further comprising a measuring section which measures the characteristic of an antenna mounted on the portable terminal equipment on which the electronic device is mounted, wherein the determining section determines setting contents corresponding to the characteristic of the antenna mounted on the portable terminal equipment measured by the measuring section.

11. The electronic device according to claim 10, wherein the measuring section measures the characteristic of the antenna mounted on the portable terminal equipment on which the electronic device is mounted by supplying a test signal to the antenna.

12. The electronic device according to claim 10, wherein the measuring section measures a value of an equivalent circuit of the antenna mounted on the portable terminal equipment on which the electronic device is mounted, and the determining section determines setting contents corresponding to the characteristic of the antenna by comparing the value of the equivalent circuit of the antenna measured by the measuring section with preset data.

13. The electronic device according to claim 7, further comprising a communicating section which performs data communication with the portable terminal equipment on which the electronic device is mounted, wherein the determining section determines setting contents corresponding to the characteristic of the antenna mounted on the portable terminal equipment based on equipment information acquired from the portable terminal equipment via the communicating section.

14. The electronic device according to claim 7, wherein the radio communication performed by the communication control circuit is a short-range radio communication.

15. A control method for an electronic device that is removably mounted on portable terminal equipment and includes acquiring equipment information of the portable terminal equipment from the portable terminal equipment on which the electronic device is mounted, the method comprising:

determining setting contents for a communication control circuit according to the portable terminal equipment on which the electronic device is mounted, and making settings for the communication control circuit which performs radio communication with an external device based on the thus determined setting contents in a state in which the electronic device is mounted on the portable terminal equipment, wherein the determining setting contents determines setting contents corresponding to a communication protocol used for radio communication by the communication control circuit based on the equipment information acquired from the portable terminal equipment, and the setting sets a communication protocol for the communication control circuit based on the setting contents corresponding to the thus determined communication protocol.

16. The control method for the electronic device according to claim 15, wherein the radio communication performed by the communication control circuit is a short-range radio communication.

17. A control method for an electronic device that is removably mounted on portable terminal equipment the method comprising:

determining setting contents for a communication control circuit according to the portable terminal equipment on which the electronic device is mounted, and making settings for the communication control circuit which performs radio communication with an external device based on the thus determined setting contents in a state in which the electronic device is mounted on the portable terminal equipment, wherein determining setting contents determines setting contents corresponding to the characteristic of an antenna mounted on the portable terminal equipment on which the electronic device is mounted and used for radio communication with an external device by the communication control circuit, and the setting is to make a setting for the communication control circuit based on the determined setting contents corresponding to the characteristic of the antenna mounted on the portable terminal equipment.

18. The control method for the electronic device according to claim 17, further comprising measuring the characteristic of an antenna mounted on the portable terminal equipment on which the electronic device is mounted, wherein the determining is to determine setting contents corresponding to the measured characteristic of the antenna mounted on the portable terminal equipment.

19. The control method for the electronic device according to claim 17, further comprising acquiring equipment information of the portable terminal equipment from the portable terminal equipment on which the electronic device is mounted, wherein the determining is to determine setting contents corresponding to the characteristic of the antenna mounted on the portable terminal equipment based on the equipment information acquired from the portable terminal equipment.

20. The control method for the electronic device according to claim 17, wherein the radio communication performed by the communication control circuit is a short-range radio communication.

* * * * *